United States Patent Office 3,634,554
Patented Jan. 11, 1972

3,634,554
FLAME RESISTANT ACRYLIC CONTAINING ISOBORNYL ACRYLATE OR METHACRYLATE
George E. Forsyth, Trevose, Pa., assignor to Rohm & Haas Company, Philadelphia, Pa.
No Drawing. Continuation-in-part of abandoned application Ser. No. 444,853, Apr. 1, 1965. This application Apr. 25, 1969, Ser. No. 819,484
Int. Cl. C08f 29/50
U.S. Cl. 260—901                                8 Claims

ABSTRACT OF THE DISCLOSURE

Acrylic sheet having superior flame resistance properties and a superior balance of physical properties is provided. The acrylic sheet comprises at least 50% methyl methacrylate, 5 to 30% isobornyl methacrylate or isobornyl acrylate, 5 to 25% of a flame-resistant polymeric phosphorus compound, and 0 to 10% of at least one other acrylic ethylenically unsaturated monomer.

This application is a continuation-in-part of pending application Ser. No. 444,853, filed Apr. 1, 1965 now abandoned.

DESCRIPTION OF THE INVENTION

The objects of this invention are: to provide (a) a stable acrylic sheet, (b) an acrylic sheet that has superior flame-resistant properties, (c) an acrylic sheet that possesses superior qualities in reduced water absorption, (d) an acrylic sheet that exhibits enhanced outdoor exposure stability in a wide range of different climates, (e) an acrylic sheet that has a high heat distortion temperature, (f) an acrylic sheet that has superior structural strength and marked dimensional stability, (g) an acrylic sheet that can be formed and processed with ease of operation, and most particularly (h) an acrylic sheet of sparkling clarity that possesses concurrently all of the above-delineated valuable properties.

The main body of the acrylic sheet of this invention comprises (I) at least 50% methyl methacrylate and, preferably, at least 55% methyl methacrylate; (II) 5 to 30% isobornyl methacrylate or isobornyl acrylate—preferably 5 to 20% and most preferably 5 to 10%, isobornyl methacrylate being preferred; (III) 0 to 10% of a modifying acrylic compound such as at least one other ethylenically unsaturated acrylic monomer, preferably 0 to 5% and most preferably 0.5 to 5%; and (IV) 5 to 25% of a flame-resistant polymeric phosphorus compound, preferably 5 to 15% and most preferably 10 to 15%. The percentages total 100. The sheet comprises a copolymer of (I), (II), and (III) polymerized with (IV) or merely in admixture with (IV).

The copolymer of (I), (II), (III) and (IV) may constitute the entire body of the sheet or it may constitute the main body of the acrylic sheet and serve as a binder for common additives such as coloring dyes or pigments, release agents and other additives. The copolymer of (I), (II), and (III) serves as the main body of the sheet and as a binder for the flame-resistant phosphorus compound and any other additives, if present, when (IV) does not enter into the polymerization.

A preferred embodiment of the invention is an acrylic sheet the main body of which comprises (I) 50 to 90% by weight methyl methacrylate, (II) 5 to 30% by weight of a member selected from the class consisting of isobornyl acrylate and isobornyl methacrylate, and (III) 0 to 10% by weight of an ethylenically unsaturated acrylic compound polymerized in admixture with (IV) 5 to 25% by weight of a flame-resistant polymeric phosphorus compound. In a preferred embodiment of the invention, (I) is present in an amount of 55 to 85%, (II) is present in an amount of 5 to 20%, (III) is present in an amount of 0. to 10% and (IV) is present in an amount of 10 to 15%, all percentages being by weight. In another preferred embodiment of the invention, (I) is present in an amount of 60 to 84.5% and (IV) is present in an amount of 0.5 to 5%; more preferred is where (IV) is chosen individually or as a mixture of the group consisting of methacrylic acid, acrylic acid and polyethylenically unsaturated acrylic monomers, all percentages being by weight.

The isobornyl methacrylate must be employed within the broad range above and cannot be substituted within the purposes of this invention. One needs to adhere strictly to the identity and amounts of the isobornyl methacrylate or isobornyl acrylate in order to realize the valuable concurrence of properties listed heretofore.

The ethylenically unsaturated acrylic monomer, which may be used in quantities up to 10%, includes monoethylenically unsaturated acrylic compounds and polyethylenically unsaturated acrylic compounds. These unsaturated acrylic compounds constitute a class of compounds known in the art and include but are not limited to such compounds as methacrylic acid, acrylic acid, alkyl esters and substituted alkyl esters of acrylic acid and methacrylic acids, such as ethyl acrylate, butyl acrylate, 2-ethylhexyl acrylate, isobutyl acrylate, isobutyl methacrylate, ethylthioethyl methacrylate or acrylate, isobutyl acrylate, halogenated alkyl methacrylate, glycidyl methacrylate and the like; and di- or polyacrylic esters of diols and polyols, such as 1,3-butylene dimethacrylate, 1,3-butylene diacrylate, trimethylolpropane trimethacrylate and the like; acrylic nitriles, such as acrylonitrile, methacrylonitrile and the like. The inclusion of these ethylenically unsaturated acrylic compounds offers special characteristics that are particularly useful in some end-use applications. For example, the inclusion of methacrylic acid improves physical properties including the heat distortion temperature and clarity when some polymeric phosphorus compounds are utilized in the invention. The preferred amount of methacrylic acid is 0.5 to 5%. As another example, polyethylenically unsaturated acrylic monomers and alkylthioalkyl acrylic esters may be utilized to improve high temperature heat resistance and other physical properties. Generally, the concentrations of the polyethylenically unsaturated monomers are maintained at a low level to allow thermoforming of the sheet. Preferred concentrations of these polymeric unsaturated monomers are 0.01 to 0.1%, more preferred is 0.025 to 0.075%. The ethylenically unsaturated acrylic monomers may be a mixture of two or more of the compounds from the class. The variation of the invention by including these ethylenically unsaturated acrylic monomers is within the gamut of this invention.

The exact substituents and substitutions on the structure of the flame-resistant polymeric phosphorus compound are not critical. They may be represented by a single compound or a mixture of compounds as desired. These phosphorus compounds may be phosphites, phosphates, phosphonates or phosphinates or mixtures thereof. It is preferred that at least some or all of the phosphorous atoms in the polymer be pentavalent in nature. The polymeric phosphorus compound must contain at least two phosphorus atoms, and it is preferred that it contain at least three phosphorus atoms. The compound may also contain halogen such as chlorine or bromine. Other substituents that may be present include cyano, nitro, ether, ester, amide or other groups, the important thing being that they are polymeric phosphorus-containing compounds of known flame-resistant qualities when incorporated into plastic masses. A polymeric phosphorus compound may contain carbon-to-carbon unsaturation by virtue of which it may enter into the polymerization of the monomers of this invention. Because of the physical nature of these phosphorus compounds it is sometimes difficult to determine the exact nature of entry and the exact degree to which such compounds enter into the polymerization. It is generally not critical whether the phosphorus compound enters into the polymerization as long as it falls into the general class of flame-resistant polymeric phosphorus compounds. In those instances wherein the phosphorus compound does not enter into the polymerization, the main body of the sheet is a copolymer of (I), (II), and (III) and may be considered a binder of the phosphorus polymer.

The phosphorus polymeric compounds suitable in this invention include but are not limited to the compounds characterized by the following general formulas (A), (B), (C), (D), (E), (F), (G), and (H):

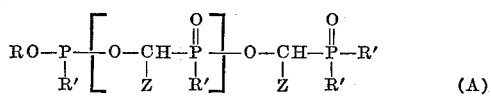

wherein R is selected from the class consisting of alkyl, haloalkyl, alkoxyalkyl, aryloxyalkyl, haloalkenyl, alkoxyhaloalkyl and phenoxyhaloalkyl radicals of from 1 to 12 carbon atoms, R' is selected from the class consisting of —OR, monocyclic and aromatic hydrocarbon radicals of from 6 to 12 carbon atoms, Z is selected from the class consisting of hydrogen and alkyl, alkenyl, aryl, alkylthioalkyl, and carboalkoxyalkyl radicals of from 1 to 17 carbon atoms and the furyl radical, and $n$ is at least 1;

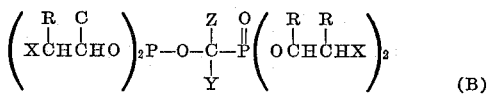

in which R is selected from the class consisting of hydrogen, alkyl, haloalkyl and alkenyl radicals of from 1 to 6 carbon atoms, the phenyl radical, and alkoxyalkyl and phenoxyalkyl radicals of from 2 to 7 carbon atoms and in which the sum of the carbon atoms in the two R radicals is less than 9; X is selected from the class consisting of chlorine and bromine; Y is selected from the class consisting of hydrogen, and the radicals; alkyl of from 1 to 17 carbon atoms, alicyclic hydrocarbon which are free of $\alpha,\beta$-unsaturation and have from 5 to 6 carbon atoms in the ring and a total of from 5 to 10 carbon atoms, benzenoid hydrocarbon which are free of olefinic and acetylenic unsaturation and have from 6 to 18 carbon atoms, furyl, and thienyl, and the said radicals carrying a substituent selected from the class consisting of —CN, —NO$_2$, halogen, methylenedioxy, —CHO, —OH, alkyl, —COOalkyl, —Oalkyl, —Salkyl, (alkyl)$_2$N— and alkyl-CONH— where alkyl denotes an alkyl radical of from 1 to 5 carbon atoms; Z is selected from the class consisting of hydrogen and the methyl radical and is methyl only when Y is an alkyl radical of from 1 to 2 carbon atoms; and Z and Y together with the carbon atoms to which they are attached stand for an alicyclic ring selected from the class consisting of cycloalkylene and cycloalkenylene radicals having 6 carbon atoms in the ring and a total of from 6 to 11 carbon atoms, and being free of $\alpha,\beta$-unsaturation;

$$(RO)_2\overset{O}{\overset{\|}{P}}OCH\overset{O}{\overset{\|}{P}}(OR'')_2$$
$$\overset{|}{R'}$$
(C)

wherein R is an aryl radical having from 6 to 12 carbon atoms; R' is an alkyl radical having from 1 to 11 carbon atoms; and R'' is an alkyl radical having from 1 to 12 carbon atoms;

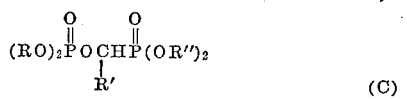

(D)

wherein R and R' are radicals independently selected from the group consisting of hydrogen and hydrocarbon radicals free of ethylenic and acetylenic unsaturation and containing from 1 to 10 carbon atoms and $n$ is an integer from 10 to 10,000;

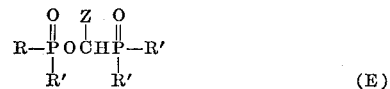

and

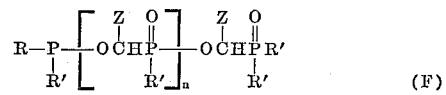

where R is selected from the class consisting of haloalkyl, haloalkenyl, alkoxyhaloalkyl and aryloxyhaloalkyl radicals of from 1 to 12 carbon atoms, R' is selected from the class consisting of —OR, —O— hydrocarbon and hydrocarbon radicals of from 1 to 12 carbon atoms and aromatic halohydrocarbon radicals of from 6 to 12 carbon atoms, Z is selected from the class consisting of hydrogen, hydrocarbon, halohydrocarbon, cyanohydrocarbon, carboalkoxyhydrocarbon, alkoxyhydrocarbon and alkylthiohydrocarbon radicals of from 1 to 17 carbon atoms and the thenyl and furyl radicals, and $n$ is a number of at least 1; such as

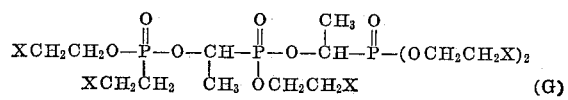

wherein X is halogen; and

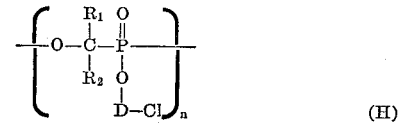

Wherein $R_1$ and $R_2$ each contain up to 12 carbon atoms and represent alkyl, phenyl, phenylalkyl, alkylphenyl, alkenyl and alkoxycarbonyl; $R_1$ and $R_2$, taken collectively with the carbon atom to which they are attached, form an aliphatic ring of 5 to 7 carbon atoms; this aliphatic ring may be saturated or monounsaturated; preferred is that the total number of carbon atoms in $R_1$ plus $R_2$ be no greater than 17, also preferred is that at least one of $R_1$ and $R_2$ represent alkyl;

Wherein the alkylphenyl embodiment of $R_1$ and $R_2$ may consist of one or more alkyl substituents on the phenyl ring, as desired, as long as the total carbon content is observed; when a phenyl ring is employed in $R_1$ or $R_2$, it may contain inert substituents, such as chlorine and the like;

Wherein D represents an alkylene group of 2 to 3 carbon atoms or the alkyl-substituted alkylene group wherein the alkylene portion contains 2 to 3 carbon atoms and the alkyl substituents total up to 8 carbon atoms; and Wherein the symbol $n$ is an integer of 2 to at least 10,000 and preferably of such a value that the molecular weight of the polymer is at least 800 and particularly 800 to about 100,000.

The polymer (H) is useful as a flame-retardant and flameproofing agent for various polymer systems. Generally, phosphorus polymers having molecular weights of at least about 5,000 and up to 65,000 and above are, in addition, useful as flame-retardant and flameproof products themselves.

The present addition phosphonate polymers (H) are prepared by reacting, in a range of about —70° to 100° C., preferably —20° to 60° C., two components, an enolizable ketone with a cyclic chlorophosphite. The enolizable ketone reactant may be represented by the formula

wherein $R_2$ has the structure

and $R_1$ and $R_2$ have the significance discussed hereinbefore, although actually any ketone that will enolize will perform satisfactorily in the process of the present invention.

Addition polymers are referred to in this application in harmony with the definition given in "Principles of Polymer Chemistry" by Paul J. Flory, p. 37 et seq., 1953.

Typically, the ketone reactants include acetone, butanone, hexanone, heptanone, octanone, dodecanone, octadecanone, cyclopentanone, cyclohexanone, cycloheptaone, acetophenone, acetochlorophenone, phenylpropanone, chlorophenylpentanone, phenylpentanone, diphenylhexanone, phenyloctanone, phenyldodecanone, pentenone, hexenone, dodecenone, cyclopentenoe, cyclohexenone, propenylpropanone, butenylpropanone, hexanylhexanone, octenylbutanone, methoxycarbonyl propanone, ethoxycarbonyl propanone, methoxycarbonyl butanone, butoxycarbonyl butanone, hexoxycarbonyl pentanone, octoxycarbonyl octanone, methoxycarbonyl pentenanone, pentoxycarbonyl octenone and octoxycarbonyl heptenone. These ketones can be used in any of their isomeric forms as long as they conform to the enolizable structure presented hereinbefore. Generally, only one ketone will be used in any one reaction but it is possible to employ mixtures of ketones, if desired. Such mixtures are within the gamut of this invention.

The chlorophosphite reactant in the preparation of phosphorous polymer (H) may be represented by the formula

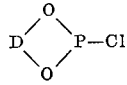

wherein D has the significance previously set forth. Typical embodiments of the halophosphite reactant include ethylene chlorophosphite, propylene chlorophosphite, trimethylene chlorophosphite, dimethylethylene chlorophosphite, propylethylene chlorophosphite, dibutylethylene chlorophosphite, dimethylpropylene chlorophosphite, butylpropylene chlorophosphite, butyltrimethylene chlorophosphite, diethyltrimethylene chlorophosphite, dibutylethylene chlorophosphite, dimethylpropylene chlorophosphite and butyltrimethylene chlorophosphite.

Generally, the chlorophosphite will be used as such, but in many instances it is desirable to prepare the chlorophosphite in situ by the reaction of the suitable glycol with phosphorus trichloride. The ketone is then added thereto. It is possible to incorporate bromine into the polymer, if desired, by using initially a chlorophosphite and then introducing hydrogen bromide into the reaction medium.

The above-described reaction may be conducted without a solvent, but there may be used an inert, volatile, organic solvent in order to expedite the reaction and provide a medium in which the stability of the product is not adversely affected. Typical solvents include esters, such as methyl methacrylate and ethyl acetate; chlorinated aliphatic compounds, such as methylene chloride and ethylene chloride; and aromatic hydrocarbons, such as xylene, benzene and toluene.

The above reaction is conducted in an acid medium which is created by the addition of an acid itself or a compound that generates acid from the chlorophosphite reactant. These include water, methanol, ethanol, hydrochloric acid, sulfuric acid, or Lewis acids, such as boron trifluoride and the like.

The addition phosphonate polymer (H) is substantially transparent and ranges from colorless to straw-yellow liquids to glassy solids. Particularly useful are those that are thermally stable, at least up to about 140° C. The solution of the addition phosphonate polymer may be incorporated into the methyl methacrylate polymer system and the system stripped to remove solvent and unused reactants. This leaves the addition phosphonate polymer (H) intimately incorporated in the desired polymer system which will then ultimately yield structural acrylic sheet of outstanding properties.

The solution of addition phosphonate polymer (H) may also be incorporated into the methyl methacrylate system or into a syrup consisting of a partially polymerized monomer or consisting of a solution of polymer and monomer and the system stripped to remove solvent. The resulting mixture may then be converted by conventional methods to the acrylic sheet of this invention. Other methods of incorporating the addition phosphonate polymer into the methyl methacrylate system will be apparent to those skilled in the art, such as by dry blending, hot melting and others.

Preferred embodiments of the addition phosphonate polymer (H) are those where $R_1$ and $R_2$ represent alkyl, D represents an alkylene chain of 2 to 3 carbon atoms and the molecular weight of the phosphonate polymer is at least 800, up to about 65,000.

The method of preparations of the phosphorus polymers (A) through (G) is known in the art and disclosed in U.S. Pats. Nos. 3,014,944; 3,014,951; 3,014,954; 3,014,956; 3,020,306; 3,058,941; and 3,161,607.

Other preferred flame-resistant and retardant polymeric phosphorus compounds are those containing halogens, especially chlorine or bromine or both.

Preferred phosphorus polymers useful in this invention as represented by Formula A include those compounds where:

R is 2-chloroethyl,
R' is 2-chloroethoxy,
Z is methyl, and
n is 1;
R is 2-bromo, 3-chloropropyl,
R' is 2-bromo, 3-chloropropoxy,
Z is ethyl, and
n is 1; and
R is ethyl,
R' is ethoxy,
Z is methyl, and
n is 1.

Preferred phosphorus polymers useful in this invention as represented by Formula B include those compounds where:

R is hydrogen,
X is chlorine,
Y is phenyl, and
Z is hydrogen; and
R is hydrogen,
X is chlorine,
Y is ethyl, and
Z is hydrogen.

Preferred phosphorus polymers useful in this invention as represented by Formula C include those compounds where:

R is phenyl and
R' is nonyl; and
R is chlorophenyl and
R' is ethyl.

Preferred phosphorus polymers useful in this invention as represented by Formula D include those compounds where:

R and R' are hydrogen,
R" is methyl, and $n$ is 100; and
R is hydrogen,
R' is 2-chloroethyl,
R'' is tertiary butyl, and
$n$ is 1000.

Preferred phosphorus polymers useful in this invention as represented by Formula E include those compounds where:

R and R' are 2-chloroethyl and
Z is methyl;
R and R' are 2-chloro-n-propyl and
Z is methyl;
R is 1-chloroethyl
R' is 2-chloroethyl, and
Z is methyl;
R and R' are 2-chloroethyl and
Z is vinyl;
R and R' are 2-chloroethyl and
Z is phenyl; and
R and R' are 2-bromo-3-chloro-n-propyl and
Z is methyl.

Preferred phosphorus polymers useful in this invention as represented by Formula F include those compounds where:

R and R' are 2-chloroethyl,
Z is methyl, and
$n$ has an average value of 2;
R is 1-chloroethyl,
R' is 2-chloroethyl,
Z is methyl, and
$n$ has an average value of 1;
R and R' are 2,3-dichloro-n-propyl,
Z is methyl, and
$n$ has an average value of 1;
R and R' are 2-bromo-3-chloro-n-propyl,
Z is methyl, and
$n$ has an average value of 1; and
R is 2-chloroisopropyl,
R' is 2-chloro-n-propyl,
Z is methyl, and
$n$ has an average value of 10.

Preferred phosphorus polymers useful in this invention as represented by Formula H include those compounds where:

$R_1$ and $R_2$ are methyl,
D is ethylene, and
$n$ is an average value of 200;
$R_1$ is phenyl,
$R_2$ is methyl,
D is ethylene, and
$n$ is an average value of 50; and
$R_1$ and $R_2$ are methyl,
D is n-propylene, and
$n$ is an average value of 10.

While various modifications of acrylic sheet have been tried with the idea of developing superior characteristics with respect to the many properties disclosed hereinbefore, it is common experience that, when some properties are improved, others are adversely affected. It is a particular distinction of the present invention that superior performances are observed concurrently in the aforementioned categories.

The properties of the present stable acrylic sheet were evaluated by standard methods, such as the various ASTM procedures and the like. The flame-resistant and flame-retardant properties were evaluated according to ASTM Procedure D635–56T. For acrylic sheet to be broadly commercially acceptable, it should be characterized as non-burning or self-extinguishing; that is, it should not burn at all or, if it starts to burn, it should extinguish itself within a defined distance. This self-extinguishing characteristic is usually measured in inches per minute and values such as 1/10 to 2/10 are consistently achieved.

The water absorption property was evaluated according to ASTM Procedure D570–59T. Periods of evaluation of seven days in a room temperature water bath and twenty-one hours in a 60° C. water bath consistently gave values of below 1.50% by weight of water absorbed. Frequently, values of less than 1.25% by weight of water absorbed were obtained. The preferred embodiments and ranges of components previously defined frequently lead to water absorption values of 1% and below.

The heat distortion evaluations were made using ASTM Procedure D648–56. Values in this respect were consistently obtained above 90° C. and frequently above 100° C.

The acrylic sheet of this invention exhibits substantial stability toward outdoor climatic conditions over prolonged periods of time. Essentially no changes in color and clarity were observed in periods of time well over 1000 hours, up to six months and beyond. These exposure evaluations were made according to standard Fade-Ometer and Weatherometer procedures.

The ease of manufacturing was consistently observed in that as the sheet material is prepared, according to standard techniques, it is readily removed from the molds without distortion or cracking. There was no evidence of sticking to molds and, therefore, the sheet could be consistently produced under normal operating conditions. The acrylic sheet exhibited satisfactory structural strength and could be formed into various configurations at normal operating conditions. For instance, the acrylic sheet of this invention can be vacuum formed easily, at low forming temperatures of 150° C., or lower, so as to fill even small mold cavities of about 8 centimeters in diameter and 4 centimeters deep.

The surprising and considerably advantageous result of the acrylic sheet of this invention is that it possesses all of the above-desired qualities at the same time and exhibits remarkable stability through prolonged periods of use.

The acrylic sheet is prepared and fabricated according to known techniques. No special treatment is necessary. The only requirement is rigid adherence to the components and amounts, previously described, if one is to obtain all of the valuable results of this invention.

The present invention may be more fully understood from the following illustrative examples. Parts by weight are used throughout.

EXAMPLE 1

(A) A solution of 25% acetyl peroxide in dimethyl phthalate was added to methyl methacrylate to give a 0.3% concentration of the peroxide.

Portions of mix (A) (above) were combined with the following additives:

(B) Commercially available flame retarder [1] of the formula $$ClCH_2CH_2O-\underset{\underset{ClCH_2CH_2}{|}}{\overset{\overset{O}{\|}}{P}}-O-\underset{\underset{CH_3}{|}}{\overset{\overset{O}{\|}}{CH}}-\underset{\underset{OCH_2CH_2Cl}{|}}{\overset{\overset{CH_3\ O}{|\ \|}}{P}}(OCH_2CH_2Cl)_2$$

in the amount of 12.5 parts was mixed with 87.5 parts of mix (A).

(C) Isobornyl methacrylate, in the amount of 15 parts, was mixed with 85 parts of mix (A).

(D) Isobornyl methcrylate, in the amount of 30 parts was mixed with 70 parts of mix (A).

(E) Phosphorus polymer of mix (B), in the amount of 12.5 parts, was mixed with 72.5 parts of mix (A) and 15 parts of isobornyl methacrylate.

(F) Phosphorous polymer of mix (B), in the amount of 12.5 parts, was mixed with 72.5 parts of mix (A) and 15 parts of t-butyl methacrylate.

(G) Phosphorus polymer of mix (B), in the amount of 20 parts, was mixed with 80 parts of mix (A).

The above mixes (A), (B), (C), (D), (E), (F) and

[1] Phosgard C–22–R.

(G) were cured between glass plates by methods well known to the art. After curing, the clear cast sheets, all 0.120 to 0.130 inch thick, were removed and examined for physical properties. Additives used in minor quantities such as chain regulators, exotherm peak suppressors, color dyes and pigments, lubricants and the like, do not significantly affect the advantages of this invention.

Samples of the cast sheets were flame tested by ASTM D635-56T. The cast sheet from mix (A) burned completely at a rate of 1.3 inches/minute. The cast sheet from mix (B) burned completely, but at a slower rate than (A); the rate was 0.57 inch/minute. The cast samples from mix (C) and (D) gave "normal burning" results and burned completely at the rates of 1.0 and 1.3 inches/minute, respectively. The cast sample from mix (E) was found to be "self-extinguishing" or, in other words, after the source of ignition was removed, the sample slowly extinguished itself before burning the total distance as defined in the ASTM D635-56T test method. The distance burned was 0.5 inch and the rate of burning was only 0.18 inch/minute.

The cast sample from mix (F) burned completely at a rate of 0.48 inch/minute.

The cast sample from mix (G) was found to be barely "self-extinguishing" and had a burning rate of 0.26 inch/minute.

The casting from mix (E) was wound to absorb only 1.3% water after 21 hours in water at 60° C. The casting from mix (B) absorbed 1.7% water while the casting from mix (G) absorbed 2.5% water after 21 hours in water at 60° C.

The heat distortion temperature, by ASTM D648-56 test method, for the cast sheet prepared from mix (E) was 90° C.

Accelerated exposure data after 1000 hours in the Atlas Weatherometer produced only slight changes in the edge color of the cast sheet prepared from mix (E). Likewise, actual outdoor exposure for 6 months showed little change in the appearance of the cast sheet from mix (E) compared to its original unexposed control cut from the same sheet.

Pieces of cast sheet from mix (A) and mix (E) were heated at 150° C. for 1 hour. The heated sheets were then vacuum-formed over a 3-inch diameter Buchner funnel using a reduced pressure of about 29 inches of mercury. A total volume of 160 millimeters was found for the vacuum formed casting from mix (E) compared to only 100 millimeters for the vacuum formed casting from mix (A). The volume was determined by the amount of water needed to fill the cavities formed.

A solution of 1487 parts of ethylene chlorophosphite in 2000 parts of methylene dichloride was charged to a 5-liter flask equipped with a stirrer, thermometer, reflux condenser and provision for maintenance of a nitrogen atmosphere in the flask. Over a 1-hour period, there was gradually added to this solution a total of 852 parts of acetone to which had been added 2 parts of water. A moderate exotherm was observed for a 3-hour period following completion of the acetone addition. This was controlled at, or slightly below, the reflux point by occasional cooling. When no further sign of an exothermic reaction was evident, the solution was heated and stirred at reflux. A progressive thickening was observed in the solution which remained completely clear and colorless at all times. During the reaction, samples of the solution were removed, dissolved in methyl alcohol and titrated with base to determine acid values on the solution. A gradual decrease in acidity was observed for the solution. A sample of the final polymer was isolated by evaporation of a portion of the solution to dryness. The polymeric solid was powdered and further held under a vacuum of less than 1 mm. for 20 hours to ensure removal of volatile materials. A number average molecular weight of 12,000 was found for the sample of product thus isolated.

EXAMPLE 2

Into 70 parts of mix (A) of Example 1 were mixed 12.5 parts of the above phosphonate polymer, 15 parts of isobornyl methacrylate and 2.5 parts of methacrylic acid.

After casting between glass plates, a sparkling clear cast sheet was obtained which had excellent flame resistance, low water absorption, high Vicat hardness temperature and good accelerated exposure data.

EXAMPLE 3

Into 72.5 parts of mix (A) of Example 1 were mixed 12.5 parts of the phosphorus polymer of mix (B) and 15 parts of isobornyl acrylate. The mix was cast between glass plates. A clear cast sheet having good flame resistant properties was obtained.

EXAMPLE 4

Into 57.5 parts of mix (A) of Example 1 were mixed 12.5 parts of the phosphorus polymer of mix (B), 15 parts of isobornyl methacrylate and 15 parts of isobornyl acrylate. After curing between glass plates a sparkling clear sheet was obtained. It was "non-burning" by the ASTM D635-56T test method. Its water absorption (under 1.25% by weight) and accelerated exposure properties were excellent.

EXAMPLE 5

(A) Into 75 parts of mix (A) of Example 1 were mixed 20 parts of a phosphorus compound similar to the phosphorus polymer in mix (B) of Example 1, except that 15 to 21 mole percent of the chlorine is substituted by bromine and 5 parts of isobornyl methacrylate. After curing between glass plates, a clear casting having a very high degree of flame resistance was obtained. The sheet withstood more than 10 cycles in the electric arc ignition test. In this test, a small sample was placed between two electrodes. The voltage was applied intermittently and the number of electric arc cycles for the specimen to ignite were counted. Water absorption below 1.50% by weight and stability under accelerated exposure were observed.

(B) Into 80 parts of mix (A) of Example 1 was mixed 20 parts of the phosphorus compound of mix (A) of Example 5. After curing between glass plates, a clear casting was obtained. Its degree of flame resistance was much lower than the casting from Example 5A. The sheet withstood only 3 cycles in the electric arc ignition test. Its water resistance was poorer than the casting from Example 5A after 21 hours in water at 60° C.

EXAMPLE 6

(A) Into 72.5 parts of mix (A) of Example 1 were mixed 12.5 parts of the phosphorus compound of Example 5A and 15 parts of isobornyl methacrylate. After casting between glass plates, a clear sheet was obtained which was found to be non-burning by the ASTM D635-56T test method.

A piece of this cast sheet (5" x 5") was heated in an oven at 150° C. for about 1 hour. The hot piece was then vacuum formed over a 3-inch diameter Buchner funnel using a reduced pressure of about 29 inches of mercury. The total volume formed was 163 millimeters, as measured by the amount of water to fill the cavity formed. The same test run on a cast sheet from mix (A) of Example 1 (using the same temperature, pressure and funnel) only formed to a total volume of 100 milliliters.

A piece of this casting (3" x 3") was heated in an oven at 180° C. for 1 hour. The piece was then submerged in water at room temperature for three months. The percent gain in weight was only 2.17%. The same was done to a piece of casting from mix (A) of Example 1. The percent gain in weight was 2.01%. The termal stability of the casting from Example 6A was excellent, being nearly as good as the mix (A) of Example 1 itself.

(B) Into 88.5 parts of mix (A) of Example 1 was mixed 12.5 parts of the phosphorus compound of Example 5A. After casting between glass plates, a clear sheet was obtained.

The cast sheet was flame tested by Test Method ASTM D635–56T and found to burn with a rate of 0.58 inch per minute.

A piece of the cast sheet (5″ x 5″) was heated in an oven at 150° C. for about 1 hour. The heated sheet was vacuum formed over the same 3-inch Buchner funnel used in Example 6A at a reduced pressure of about 29 inches of mercury. The total volume formed was 130 millimeters, as measured by the amount of water to fill the cavity formed. The formed piece was observed to be considerably darker in color after heating at 150° C. than either the formed piece from Example 6A or the formed piece from Example 1A.

A piece of the casting from Example 6B was soaked in water for 21 hours at 60° C. Its weight gain was found to be 1.4% whereas a piece from Example 6A soaked for 21 hours at 60° C. had a weight gain of only 0.9%.

EXAMPLE 7

Into 78 parts of mix (A) of Example 1 were mixed 12.5 parts of the phosphonate polymer of Example 2, 7.5 parts isobornyl methacrylate and 2.0 parts methacrylic acid. After casting between glass plates, sparkling, clear cast sheet was obtained. It was non-burning by the ASTM D635–56T test method. The sheet had low water absorption and a Barcol hardness of 48 to 53.

EXAMPLE 8

Into the mix of Example 7 was mixed 0.04 part trimethylolpropane trimethacrylate. After casting between glass plates, a sparkling, clear cast sheet was obtained. It was "non-burning" by an ASTM D635–56T test method. Typical physical properties of the sheet include a Charpy impact strength of 6.7 to 8.4 lbs./inch, Barcol hardness of 48 to 55, heat distortion temperature of 99 to 100° C. and good accelerated exposure resistance.

EXAMPLE 9

Ethylene chlorophosphite (161 parts) was charged to a 1-liter flask equipped with a stirrer, thermometer and reflux condenser. A nitrogen atmosphere was maintained over the chlorophosphite. Methyl hexyl ketone (164 parts) and 5.9 parts of ethyl alcohol were added gradually over a 90-minute period. Sufficient cooling was applied to hold the temperature at 50° C. At the end of the addition, the viscous mixture was heated and stirred at 100° C. for 3 hours, then held under a pressure of 0.3 mm. for 90 minutes. A yield of 305 parts of colorless, very viscous phosphonate polymer was obtained containing 12.6% phosphorus and 13.6% chlorine.

Into 70 parts of mix (A) of Example 1 were mixed 12.5 parts of the above phosphonate polymer, 15 parts of isobornyl acrylate and 2.5 parts of methacrylic acid. After casting between glass plates, a clear cast sheet was obtained which had excellent flame resistance, low water absorption, high Vicat hardness temperature and good accelerated exposure data.

EXAMPLE 10

Ethylene chlorophosphite (63 parts) and diethyl ketone (86 parts) were combined with stirring. A gradual exothermic heat of reaction was observed, causing the temperature to rise to 39° C., after which the mixture was heated to 100° C. for 2 hours. The mixture was then stripped at 110° C. under 10 mm. pressure until no further distillate could be removed. The phosphonate polymer residue (94 parts) was a light yellow oil.

Into 70 parts of mix (A) of Example 1 were mixed 12.5 parts of the above phosphonate polymer and 18 parts of isobornyl acrylate. After casting between glass plates, a clear cast sheet was obtained which had excellent flame resistance, low water absorption, high Vicat hardness temperature and good accelerated exposure data.

EXAMPLE 11

To a stirred solution of 246 parts of 1,2-propylene chlorophosphite in 322 parts of methylene dichloride, held under a nitrogen atmosphere, there was added over a 1-hour period, 127 parts of acetone containing 0.3 part of water. Stirring was continued for a 1-hour period, during which time the temperature of the mixture rose spontaneously from 32° to 39° C. The mixture was then heated and stirred at the reflux point for a total of 100 hours. The resulting phosphonate polymer was isolated by evaporation of a portion of the solution to dryness. The polymeric solid was powdered and further held under a vacuum of less than 1 mm. for 20 hours to ensure removal of volatile matter.

Into 70 parts of mix (A) of Example 1 were mixed 15 parts of the above phosphonate polymer and 15 parts of isobornyl methacrylate. After casting between glass plates, a clear cast sheet was obtained which had excellent flame resistance, low water absorption, high Vicat hardness temperature and good accelerated exposure data.

EXAMPLE 12

Acetone (79 parts) containing 0.6 part of water was added over a 30-minute period to a stirred, nitrogen-blanketed solution of 169 parts of 1,3-butylene chlorophosphite in 216 parts of methylene dichloride. The mixture was then heated and stirred at the reflux temperature for a total of 100 hours. The resulting colorless, viscous solution had an acid value of 2 (mg. KOH per gram of sample). A portion of the solution was evaporated to dryness to provide a sample of solid phosphonate polymer. This was powdered and further held under a vacuum of less than 1 mm. for 20 hours to ensure removal of volatile material.

Into 75 parts of mix (A) of Example 1 were mixed 12 parts of the above phosphonate polymer and 13 parts of isobornyl methacrylate. After casting between glass plates, a clear cast sheet was otained which had excellent flame resistance, low water absorption, high Vicat hardness temperature and good accelerated exposure data.

EXAMPLE 13

A mixture of 286 parts of ethyl acetoacetate and 10 mole percent ethanol was stirred at 40° to 50° C. while 225 parts of ethylene chlorophosphite was added. The mixture was heated on a steam bath for 2 hours and then stripped at less than 1 mm. pressure to remove volatile components. The residue was an addition phosphonate polymer.

Into 70 parts of mix (A) of Example 1 were mixed 16 parts of the above phosphonate polymer and 14 parts of isobornyl acrylate. After casting between glass plates, a clear cast sheet was obtained which had excellent flame resistance, low water absorption, high Vicat hardness temperature and good accelerated exposure data.

EXAMPLE 14

Redistilled cyclohexanone (323.4 parts) was added with stirring to a mixture of 379.5 parts of ethylene chlorophosphite in 644.1 parts of methylene dichloride over a 1-hour period while the temperature of the mix was maintained at 0° to 1° C. The mixture was stirred at 0° to 6.5° C. for 6 hours, from 6.5° to 23° C. over a 16-hour period and at 48° C. for 4 hours, after which it had an acid number based on polymer solids of 4.31. A sample of the phosphonate polymer solid, isolated by evaporating the solvent and excess cyclohexanone under vacuum, melted at about 120° C.

Into 78 parts of mix (A) of Example 1 were mixed 11 parts of the above phosphonate polymer and 11 parts of isobornyl methacrylate. After casting between glass plates, a clear cast sheet was obtained which had excellent flame resistance, low water absorption, high Vicat hardness temperature and good accelerated exposure data.

What is claimed is:

1. As an article of manufacture, an acrylic sheet, the main body of which is formed of an addition copolymer formed in a mixture comprising:

(I) at least 50% by weight of methyl methacrylate, (II) 5 to 30% by weight of a member selected from the class consisting of isobornyl acrylate and isobornyl methacrylate, (III) 0 to 10% by weight of at least one other ethylenically unsaturated acrylic compound seletced from the group consisting of methacrylic acid, acrylic acid, alkyl esters and substituted alkyl esters of acrylic acid and methacrylic acid, di and polyacrylic esters of diols and polyols, acrylic nitriles, polyethylenically unsaturated acrylic monomers, and alkylthioalkyl acrylic esters, and (IV) 5 to 25% by weight of a flame-resistant polymeric phosphorus compound, the percentages of I, II, III and IV totaling 100.

2. An acrylic sheet according to claim 1 wherein (I) is present in an amount of 55 to 85%, (II) is present in an amount of 5 to 20% and (IV) is present in an amount of 10 to 15%.

3. An acrylic sheet according to claim 2 wherein (I) is present in an amount of 60 to 84.5%, and (III) is present in an amount of 0.5 to 5%.

4. An acrylic sheet according to claim 1 wherein (IV) is an addition phosphonate polymer characterized by the repeating unit

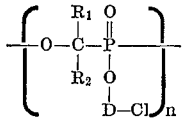

in which $n$ is an integer of 2 to about 10,000;

D is a member from the class consisting of alkylene of 2 to 3 carbon atoms and alkyl-substituted alkylene wherein the alkylene contains 2 to 3 carbon atoms and the alkyl substitution totals up to 8 carbon atoms;

$R_1$ and $R_2$, taken individually, each contain up to 12 carbon atoms and are members from the class consisting of alkyl, phenyl, phenylalkyl, alkylphenyl, alkenyl and alkoxycarbonyl; and $R_1$ and $R_2$, taken collectively with the carbon atom to which they are attached, form a member from the class consisting of saturated and monounsaturated aliphatic rings of 5 to 7 carbon atoms.

5. An acrylic sheet according to claim 1 wherein (IV) is a polymer of a monomer characterized by the formula

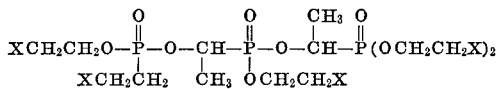

wherein X is halogen.

6. An acrylic sheet according to claim 3 wherein (III) is chosen from the group consisting of methacrylic acid, acrylic acid and polyethylenically unsaturated acrylic monomer.

7. An acrylic sheet according to claim 6 wherein (I) is present in an amount of 59.9 to 84.49% and (III) consists of 0.5 to 5% methacrylic acid and 0.01 to 0.1% polyethylenically unsaturated acrylic monomer.

8. An acrylic sheet according to claim 1 wherein (III) consists of methacrylic acid.

References Cited

UNITED STATES PATENTS 3,468,980  9/1969  Forsyth _____ 260—901

FOREIGN PATENTS 653,799  12/1962  Canada _____ 260—86.1

MURRAY TILLMAN, Primary Examiner

J. SEIBERT, Assistant Examiner

U.S. Cl. X.R.

260—45.7 P, 63 R, 80.8, 80.81, 86.1 E, 881, 884, 885, 931